United States Patent [19]

Usui

[11] 4,223,826
[45] Sep. 23, 1980

[54] METHOD OF BRAZING STAINLESS STEELS

[75] Inventor: Masayoshi Usui, Numazu, Japan

[73] Assignee: Usui Kokusai Sangyo Kabushiki Kaisha, Nagasawa, Japan

[21] Appl. No.: 7,224

[22] Filed: Jan. 29, 1979

[51] Int. Cl.$^2$ .......................... B23K 1/04; B23K 1/20; B23K 35/28

[52] U.S. Cl. ....................................... 228/208; 204/44; 228/209; 228/210; 228/219; 228/263; 427/229

[58] Field of Search ............... 228/208, 209, 219, 210; 204/44; 427/229

[56] References Cited

U.S. PATENT DOCUMENTS

| | | | |
|---|---|---|---|
| 2,779,999 | 2/1957 | Boam et al. | 228/209 |
| 3,440,151 | 4/1969 | Duva et al. | 204/44 |
| 3,672,036 | 6/1972 | Ziemianski | 228/208 |
| 3,821,018 | 6/1974 | Grant | 427/377 |
| 3,844,027 | 10/1974 | Hagen | 228/209 |

FOREIGN PATENT DOCUMENTS

43-430  9/1968  Japan ....................................... 228/209

OTHER PUBLICATIONS

Brazing Manual, published by American Welding Society Inc., pp. 36, 43, 44, 184–193, c 1963.
Metal Engineering Dictionary, Masao Terasawa, p. 505, Nov. 30, 1962.

*Primary Examiner*—John D. Smith
*Attorney, Agent, or Firm*—Anthony J. Casella

[57] ABSTRACT

A method of brazing a stainless steel with a stainless steel or another metal wherein, in brazing the stainless steel with a stainless steel or another metal, the stainless steel side of both opposed jointing parts is plated with copper, then a copper base-tin alloy of a melting point of 850° to 1081° C. is used as a brazing material and said brazing material is heated together with the jointing parts to a temperature lower than the melting point of copper in a nonoxidizing gas atmosphere such that the brazing material may be melted at said temperature.

The brazed stainless steels are cooled by being quickly passed through a temperature range of 850° to 600° C. The bonding force of the resulting stainless steels is much higher than heretofore obtained.

9 Claims, No Drawings

METHOD OF BRAZING STAINLESS STEELS

BACKGROUND OF THE INVENTION

1. Field of the Invention

This invention relates to methods of brazing a stainless steel with a stainless steel or another metal.

2. Description of the Prior Art

In the conventional brazing method, stainless steel materials are plated with copper on the jointing surfaces, are pressed together on the copper-plated surfaces or have a linear, powdery or pasty copper brazing material added and deposited between the opposed copper-plated surfaces, are laid and are heated above the melting point of copper so as to melt the copper (see page 505 of "Metal Engineering Dictionary" written by Masao Terasawa and published on Nov. 30, 1962.). The bonding effect obtained by such method will be low in the case of stainless steel materials and thus an improved method of brazing stainless steel having improved bonding effect is desired.

SUMMARY OF THE INVENTION

An object of the present invention is to provide a method of brazing stainless steels wherein such defect as is mentioned above is eliminated.

As a result of studying the cause of the above mentioned defect, the present inventor has discovered that, according to the conventional method, the copper-plating layer protecting the jointing surface of the stainless steel will be melted when heated and therefore the jointing surface of the stainless steel is oxidized when the copper-plating layer melts.

The method according to the present invention is characterized in that, in brazing a stainless steel with a stainless steel or another metal, the stainless steel side of both opposed jointing parts is plated with copper, then a copper base-tin alloy of a melting point of 850° to 1081° C. is used as a brazing material and said brazing material is heated together with the joining parts to a temperature lower than the melting point of 1082° C. of copper in a non-oxidizing gas atmosphere such that the brazing material may be melted at said temperature.

DETAILED DESCRIPTION OF THE INVENTION

In the present invention, the stainless steel means such stainless steel material in the form of a bar, pipe or plate or a part or small article made of it, the other metal means being iron or steel material in the form of a bar, pipe or plate or part or small article made of it and further the other metal includes a metal or alloy of a melting point higher than of the above mentioned brazing material used at the time of working the present invention.

It might be noted that, in working the present invention, the jointing part of the other metal need not be plated with copper and it is not an essential requirement to copper-plate it.

In the present invention, as examples of brazing a stainless steel with a stainless steel, there can be enumerated (1) pressed jointed wall surfaces of an inside pipe and outside pipe formed by double winding a stainless steel strap in the width direction in obtaining a double wound fine diameter steel pipe made of a stainless steel and (2) seamed parts of an electrically seamed pipe made of a stainless steel strap and, as an example of brazing a stainless steel with another metal, there can be enumerated (3) a connecting port of a connector (eye joint) made of a carbon steel material and an end of a stainless steel pipe.

On the above mentioned alloy brazing material used for brazing them, there are exemplified electroplating layers applied to the pressed jointed wall surfaces in the case of (1), the above mentioned alloy material formed to be string-shaped in the case of (2) and a paste obtained by obtaining a viscous substance by adding water to methyl cellulose and mixing a powder of the above mentioned alloy with the viscous substance in the case of (3).

The non-oxidizing gas used in the present invention is obtained by converting propane, butane, methane or city gas. The composition of city gas is as follows:

| | |
|---|---|
| hydrogen ($H_2$) | 44.0% |
| carbon oxide (CO) | 4.5% |
| carbon dioxide ($CO_2$) | 6.5% |
| Oxygen ($O_2$) | 3.9% |
| nitrogen ($N_2$) | 20.3% |
| methane ($CH_4$) | 9.0% |
| ethane ($C_2H_6$) | 5.0% |
| Ethylene ($C_2H_4$) | 1.8% |
| propane ($C_3H_8$) | 1.6% |
| propylene ($C_3H_6$) | 1.2% |
| butan ($C_4H_{10}$) butadiene ($C_4H_8$) butylene ($C_4H_6$) | 3.2% |

A copper base-tin alloy of a melting point of 850° to 1081° C. is used for the brazing material and the upper limit temperature is 1081° C., because, as the brazing is made at a temperature lower than the melting point of copper, the copper plating will not melt and thus the jointing part of the stainless steel will be protected from being oxidized. The lower limit temperature is 850° C., because, if the stainless steel is maintained at a temperature above 600° C. but below 850° C., chromium carbide will be deposited. Therefore, the brazed joint is cooled by being passed quickly through a temperature range 850° to 600° C. by forced air-cooling or water-cooling. Such cooling means is according to a conventional method.

The copper base-tin alloy brazing material is used in such various forms as are mentioned above. In the present invention, in any case, as the brazing operation is made at a temperature lower than the melting point of copper, applied to the jointing part of the stainless steel will not be melted. It is understood that the stainless steel can be favorably brazed in the present invention, because the plating layer of copper will not melt and therefore the stainless steel skin in the jointing part will be prevented from being oxidized during the brazing.

EXAMPLE 1

[Manner of making a double wound stainless steel pipe of a stainless steel strap]

A stainless steel strap of a material of SUS 27, thickness of 0.35 mm, width of 46.3 mm and length of 5000 mm was anodically electrolyzed for 2 minutes at a current density of 3 A/dm² at the normal temperature by using an aqueous solution of 10% sodium hydroxide so as to be defatted, was then cathodically electrolyzed for 5 minutes at a current density of 1 A/dm² at the normal temperature by using an aqueous solution prepared by adding 0.5% glycin to 15% sulfuric acid so as to be activated on the surface, was first plated with copper in the below mentioned manner on the obtained activated surface and was then plated with a copper base-tin alloy on said copper-plated surface to obtain a stainless steel strap having a copper layer in the lower layer and a copper base-tin alloy layer in the upper layer. When a double wound pipe was formed of said stainless steel strap by a conventional method (U.S. Pat. No. 2,014,982) and was heated for 3 minutes at a furnace temperature of 930° C. in an electric resistance furnace having a reducing gas atmosphere obtained by modifying a propane gas (see Metals Handbook (American Society for Metals, Metals Park, Ohio) Volume 2, 8th Edition, pages 69-73), there was obtained a favorably brazed double wound fine diameter stainless steel pipe in which the above mentioned alloy layers were opposed in contact with the pressed jointed walls were fused.

Manner of forming a plating layer of copper

A plating layer of copper of a thickness of 4 microns was formed by using a plating solution of a pH of 1.0 consisting of a composition of 70 g/l of copper sulfate 20 g/l of cuprous chloride and 0.03 g/l of glycin, making the above mentioned stainless steel strap a cathode, making pure copper an anode and passing an electric current for 10 minutes at a cathode density of 2.6 A/dm² and, was delivered to the next plating step.

Manner of forming a copper base-tin alloy layer

An alloy layer of 82% by weight copper—18% by weight tin and a thickness of 5 microns was formed on the above mentioned copper-plating layer by using a plating solution having a pH of 13.0 consisting of a composition of 15 g/l of copper cyanide, 15 g/l of sodium stannate, 45 g/l of sodium cyanide and 7.5 g/l of sodium hydroxide, making the stainless steel strap copper-plated in the above mentioned step a cathode, making an alloy plate of 80% by weight copper—20% by weight tin an anode and passing an electric current for 8 minutes at a cathode current density of 1.5 A/dm².

[Test of the bonding force]

The double wound stainless steel pipe brazed in the above mentioned manner was cut to be of a length of 200 mm to prepare 20 samples. Ten samples were taken at random and were subjected to a bending test and the remaining 10 samples were subjected to an expanding test to obtain the following test results. The tests were made by ASTM A254.

| | |
|---|---|
| Bending test passing rate: | 100% |
| Expanding test passing rate: | 100% |

When these test results are compared with the test results of Control 1 shown in the following, the excellent brazing results obtained by the method of the present invention is apparent.

Control 1

A double wound stainless steel pipe was obtained in the same manner as in Example 1 except that the furnace temperature of the electric resistance furnace having a reducing gas atmosphere was made 1120° C. in brazing and was tested in the same manner to obtain the following results:

| | |
|---|---|
| Bending test passing rate: | 80% |
| Expanding test passing rate: | 70% |

EXAMPLE 2

This example is of brazing an electrically seamed pipe made of a stainless steel to a connector (eye joint) made of a carbon steel pipe and was made in the following manner.

[Preparation of the sample]

Electrically seamed pipe made of a stainless steel

An electrically seamed pipe made of a stainless steel and having the same plating layer on the outer peripheral surface was obtained in the same manner as in Example 1 except that the stainless steel strap was replaced with an electrically seamed pipe made of a stainless steel of SUS 27, an outside diameter of 10.0 mm, thickness of 0.7 mm and length of 5000 mm.

Connector (eye joint)

The connector was made of a carbon steel and was therefore used without being plated. The connecting port of said connector was projected by 5 mm out of the peripheral wall of the connector and the opposed electrically seamed pipe was slidably fitted thereof into it.

Brazing material

A pasty brazing material obtained by mixing a powder alloy of 80% by weight copper—20% by weight tin with pasty methyl cellulose was used.

Brazing

The electrically seamed pipe made of a stainless steel and obtained by the above mentioned plating step was cut to be as short as a length of 300 mm. Five samples were taken at random and were used for the connection with the above mentioned connectors. In said connection, the above mentioned short electrically seamed pipe was fitted and inserted at its end into the connecting port of the connector so that the fitting allowance might be 5 mm. The above mentioned pasty brazing material was added and deposited between the peripheral tip edge of the connecting port and the outer peripheral surface of the fitted and inserted electrically seamed pipe enclosed with said edge and was heated to 930° C. in the same manner and under the same heating conditions as in Example 1 to obtain a brazed assembly having a head (connector) at the end of the pipe.

[Test of the bonding force]

The aboved mentioned assembly obtained by brazing was held and fixed on the head with a vise and was pressed by being rocked by five reciprocations on the right and left with a full force by being held at the end but the head was not separated from the end of the pipe. When these test results are compared with the test results of samples obtained by the later mentioned Control 2, it will be found that the brazing method of the present invention yields excellent results. Control 2:

When five brazed assemblies each having a connector as a head were obtained in the same manner as in Example 2 except that the brazing temperature of 930° C. was changed to 1120° C. and were then tested in the same manner, the heads of two of the five assemblies separated.

I claim:

1. A method of brazing stainless steels comprising a step of copper-plating the stainless steel side of both jointing parts of a stainless steel and a metal, a step of heating a brazing material which is a copper base-tin alloy of a melting point of 850° to 1081° C. together with said both jointing parts to a temperature lower than the melting point of copper in a non-oxidizing gas atmosphere and a step of melting the brazing material at said temperature.

2. The method according to claim 1 wherein said metal is a stainless steel.

3. The method according to claim 1 wherein said metal is a metal of a melting point higher than of said brazing material.

4. The method according to claim 1 wherein said metal is an alloy of a melting point higher than of said brazing material.

5. The method according to claim 1 wherein the metal side of said both jointing parts is also copper-plated.

6. The method according to claim 1 wherein said brazed stainless steel is further cooled to a temperature range of 850° to 600° C.

7. The method according to claim 1 wherein said brazing material is applied as an electroplating layer.

8. The method according to claim 1 wherein said brazing material is formed to be string-shaped.

9. The method according to claim 1 wherein said brazing material is a paste obtained by mixing a powder of a copper base-tin alloy with a viscous substance obtained by adding water to methyl cellulose.

* * * * *